No. 787,362. PATENTED APR. 18, 1905.
F. FELDHAUS.
VEHICLE TIRE AND RIM.
APPLICATION FILED SEPT. 26, 1904.
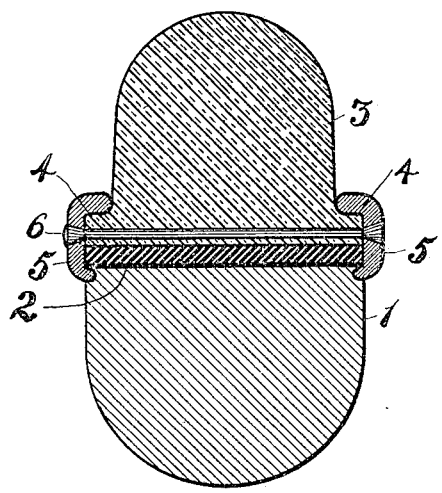

No. 787,362.

Patented April 18, 1905.

UNITED STATES PATENT OFFICE.

FRED FELDHAUS, OF AKRON, OHIO, ASSIGNOR OF ONE-HALF TO PHILLIP KNIERIM, OF AKRON, OHIO.

VEHICLE TIRE AND RIM.

SPECIFICATION forming part of Letters Patent No. 787,362, dated April 18, 1905.

Application filed September 26, 1904. Serial No. 225,955.

*To all whom it may concern:*

Be it known that I, FRED FELDHAUS, a citizen of the United States, residing at Akron, in the county of Summit and State of Ohio, have invented a certain new and useful Improvement in Vehicle Tires and Rims, of which the following is a complete specification.

My invention relates to the application of cushioned tires to wheel-rims and devices for detachably retaining them.

The objects of this invention are to so combine a cushion-tire and wheel-rim that the tire will at all times be firmly held in position and secured effectually against "creeping" or other displacement and to provide a device for securely uniting the tire and rim together, so that the tire may be readily placed in position at any time and readily removed from its seat for the purposes of repair or replacement, and a further object is to so construct the tire-retaining mechanism that when being placed in position in conjunction with a tire it will have the function of drawing the tire downward firmly upon the base-rim upon which it will seat. In accomplishing these objects I utilize three instrumentalities—first, an elastic or cushioned tire; secondly, a base or seat therefor, and, thirdly, retaining means whose office is to draw the tire firmly to the seat and then lock it in position so as to firmly secure it against circumferential motion and yet permit the tire to be capable of a ready removal from connection with the retaining means to the end that it may be easily repaired or replaced either in part or in whole.

To the accomplishment of the aforesaid objects my invention consists in the novel and peculiar construction, arrangement, and combination of parts hereinafter described, reference being had to the accompanying drawing, forming a part hereof.

In the accompanying drawing, which represents a transverse section of the tire, rim, and fastening mechanism, 1 is an ordinary flat-faced felly of a vehicle-wheel upon which is mounted a band or base-rim 2.

Arranged to be mounted upon the outside periphery of the base-rim 2 is an elastic tire 3, preferably of vulcanized india-rubber and provided near its base with projecting side ridges 4, which form in conjunction with the main body portion of the tire an annular shelf. The devices for retaining this tire upon the base-rim 2 of the vehicle-wheel consists of two rings 5, having inturned and upper and lower ends, the upper end being arranged to fit over the tops of the ridges 4 and rest on the shelf part which these ridges 4 form with the main body-tire. The lower inturned edges of the rings 5 are arranged to seat into the body portion of the felly 1 immediately below the base-rim 2. It may sometimes be found necessary or desirable to groove out the felly 1 immediately below the base-rim 2 to properly seat these rings, or it may be found that other means than this can be employed or that these rings 5 can be forced into the material of the felly without this preliminary grooving. These two rings 5 are drawn toward each other and held in position secure from circumferential motion by a series of rivets 6, the heads of which seat in one ring 5 and their other ends are upset or swaged in properly-shaped conical openings in the opposite rings 5. These rivets 6 pass through the lower portion of the tire 3 sufficiently removed from the base-rim 2 to insure a layer of rubber under them and yet separated enough to insure a secure grip upon the elastic tire. These rivets 6 are properly spaced apart from one another throughout the length of the elastic tire, the amount of space intervening between them being determined by the size and weight of the tire as well as by the quality of work to which the tire will be subjected. It is entirely within the scope of my invention to substitute for these rivets 6 threaded bolts or other suitable or preferred means for clamping the rings securely against the felly 1 and base-rim 2 and to insure their obtaining a firm and secure hold upon the shelf portion of the elastic tire. This construction of retaining means absolutely insures the elastic tire from circumferential motion or creeping on its base.

What I claim, and desire to secure by Letters Patent, is—

The combination in a device for cushioning vehicle-wheels, of a felly, a flat base-rim thereon, an elastic tire mounted on said base-rim, a pair of rings having inturned edges, one of which is adapted to be pressed into the material of the felly below the base-rim and the other to clamp upon the elastic tire and means passing through the material of the tire to draw said rings toward one another and clamp them upon said elastic tire and felly substantially as shown and described and for the purpose stated.

In testimony that I claim the above I hereunto set my hand in the presence of two subscribing witnesses.

FRED FELDHAUS.

In presence of—
C. E. HUMPHREY,
GLENARA FOX.